United States Patent [19]
Rostaing

[11] 3,846,359
[45] Nov. 5, 1974

[54] STORAGE STABLE BINDERS
[75] Inventor: Paul Rostaing, Vienne, France
[73] Assignee: Rhone-Poulenc S.A., Paris, France
[22] Filed: Mar. 27, 1973
[21] Appl. No.: 345,331

[30] Foreign Application Priority Data
Mar. 28, 1972 France .............................. 72.10820
Dec. 5, 1972 France .............................. 72.43189

[52] U.S. Cl. ... 260/22 S, 260/33.4 SB, 260/33.6 SB, 260/37 SB, 260/40 R
[51] Int. Cl. ........................................... C08g 17/16
[58] Field of Search ............. 260/33.4, 33.6, 46.5 E, 260/2 SB, 22 S; 106/287 SE

[56] References Cited
UNITED STATES PATENTS
2,716,656  8/1955  Boyd .......................... 260/46.5 E X
2,732,320  1/1956  Guillissen et al. .......... 260/46.5 E X
2,736,721  2/1956  Dexter ............................ 260/46.5 E Primary Examiner—Lewis T. Jacobs
Attorney, Agent, or Firm—Stevens, Davis, Miller & Mosher

[57] ABSTRACT

Stable binders for paints are prepared by mixing 60 to 120 parts of an $C_{1-3}$ alkylsilicate or polysilicate, 3 to 25 parts of a $C_{3-8}$ alkyltitanate or polytitanate, 10–2,000 parts of an organic, organosilicon or mixed organic-organosilicon film-forming resin and 20–1,500 parts of an organic solvent.

9 Claims, No Drawings

STORAGE STABLE BINDERS

This invention relates to processes for preparing storage stable binders, the binders so prepared and their use for forming atmosphere curing compositions.

Binders have already been used which are prepared either by reacting alkyl titanates with the products originating from the partial hydrolysis, by means of an aqueous solution of an organic or inorganic acid, of alkyl silicates (see U.S. Pat. No. 3,546,155) or by cohydrolysis and co-condensation of a mixture of alkyl silicates and alkyl titanates in an acid aqueous-alcoholic medium (see published Japanese application No. 7,024,231). Because of their particular preparation, these binders cannot be stored for a very long time and this lack of stability leads not only to losses for the users but also to the need to employ expensive apparatus suited to products which change rapidly.

Organopolysiloxane compositions have also been described which cure into protective varnishes for paints, and consist of one or more organopolysiloxane resins, a methyl or ethyl ester of orthosilicic acid in the monomer and/or polymer form, a titanate ester and/or one of its condensation products, a solvent and preferably an organic zinc salt (French Pat. No. 1,213,488 and its 1st addition Pat. No. 75,815). These compositions show good stability on storage and dry rapidly in air; however, probably because of the preparation technique as well as the proportions of reagents used, they are not suitable as binders because they have a tendency to allow the fillers which are incorporated into them to settle out.

The present invention provides a process for the preparation of a binder which comprises mixing (in parts by weight) 60 to 120 parts of component A, which is at least one of an alkyl silicate and an alkyl-polysilicate, the alkyl radicals of both of which contain 1 to 3 carbon atoms, 3 to 25 parts of component B, which is at least one of an alkyl titanate and an alkyl polytitanate, the alkyl radicals of both of which contain 3 to 8 carbon atoms, 10 to 2,000 parts of component C, which is at least one of an organic, organo-silicon and mixed organic-organo-silicon film-forming resin and 20 to 1,500 parts of component D, which is an organic solvent, in any order with stirring at 0°–40° C.

The constituents A which can be used, separately or as a mixture, are methyl silicate, ethyl silicate, isopropyl silicate and n-propyl silicate as well as their partial hydrolysis products. The latter must be soluble in the usual organic solvents, they must be stable on storage and they must have a substantially neutral pH. They are formed mainly of a succession of units of the formula

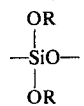

in which the symbol R represents a methyl, ethyl, isopropyl or n-propyl radical; small amounts of units of the formulae $ROSiO_{1.5}$, $SiO_2$ and $(RO)_3SiO_{0.5}$ can however be present provided that they do not exceed 15 percent of the total number. In order to characterise these polysilicates, their content of alkoxy groups or of $SiO_2$ can be taken as a basis, but it is often more practical to determine the silica, by complete hydrolysis of a sample, then the alkoxy groups. Preferred polysilicates are those which contain an amount of silicon of 40–45 percent by weight (expressed as $SiO_2$).

The methods for their preparation are well known and are described in particular in the work "Chemistry and Technology of Silicones" by W. Noll — pages 648 to 653.

The constituents B are alkyl titanates and/or polytitanates in which the alkyl radical contains three to eight carbon atoms. Examples of the alkyl titanates are isopropyl, n-propyl, butyl, pentyl, hexyl, 2-ethylhexyl, heptyl and octyl titanates. The polytitanates formed by partial hydrolysis of the above titanates are polymers which possess a linear structure consisting of units of the formula

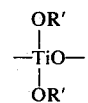

in which the symbol R' represents an alkyl group with three to eight atoms or which have a more complex structure as indicated in the work "The Organic Chemistry of Titanium" by R. Feld and P. L. Cowe, on pages 25 to 31. The structure obtained is moreover in direct relationship with the values of the molar ratio of the starting reagents, titanates/water, as well as with the conditions for carrying out the hydrolysis.

As in the case of the polysilicates, in order to characterise the polytitanates it is preferable to refer to their $TiO_2$ content, measured by complete hydrolysis of a sample. These polytitanates must be soluble in the usual organic solvents, they must be stable on storage and they must have a substantially neutral pH. Preferred titanates contain an amount of titanium of 33–38 percent by weight (expressed as $TiO_2$).

The constituents C are conventional film-forming resins amongst which are the following: Organosilicon resins prepared by co-hydrolysis and co-condensation of silanes which are of the formulae $A_3SiCl$, $A_2SiCl_2$, $ASiCl_3$ and $SiCl_4$, the symbol A representing an alkyl group of one to five carbon atoms which may be halogenated, preferably a methyl, ethyl, propyl, chloromethyl, chloropropyl or 3,3,3-trifluoro-propyl group or representing an aryl group (such as an aromatic hydrocarbon group), which may be halogenated, preferably a phenyl, tolyl, chlorophenyl, dichlorophenyl, trichlorophenyl or tetrachlorophenyl group. These resins are thus formed from units of the formula $A_3SiO_{0.5}$, $A_2SiO$, $ASiO_{1.5}$ and $SiO_2$; they are however distributed in such a way that they contain approximately 1 to 1.8 A groups per silicon atom; moreover, these resins are not completely condensed and still possess approximately 0.001 to 1.5 hydroxyl and/or alkoxy groups e.g., of one to five carbon atoms per silicon atom. Examples of suitable alkoxy radicals bonded directly to the silicon atom, are methoxy, ethoxy, propoxy, isopropoxy and butoxy radicals; the usual organic resins such as polyester and alkyd resins, which may be modified by fatty acids such as oleic, linoelic and ricinoleic acid, or esters of fatty acids and aliphatic polyols such as castor oil and tallow; alkyd resins modified by styrene; epoxy resins which may be modified by fatty acids; phenolic, acrylic and melamine/formaldehyde resins; and polyamides, polyamines, polyimides, polyamide-imides, polyureas, polyurethanes, polyethers, polycarbonates and polyphenols; mixed organosilicon-organic resins prepared by co-condensation of the above organosilicon resins and organic polymers. The ratio by weight of organosilicon resins to organic compounds can vary within wide limits and it is possible to prepare mixed copolymers containing at most 0.1 percent of the organic resin or of the organosilicon resin. The ratio is however a function of the degree of compatibility of the reagents with one another and of the use foreseen for the mixed resins thus prepared.

Copolymers of this type are described further in French Pat. Nos. 1,060,898, 1,062,573, 1,084,477, 1,100,447, 1,129,973, 1,192,426, 1,225,229 and 1,321,457, in U.S. Pat. No. 3,257,343 and British Pat. Specification No. 682,348.

The constituents D are conventional organic solvents examples of which are: Aliphatic solvents with 5 to 20 carbon atoms such as the hydrocarbons e.g., hexane, heptane, octane, dodecane and octadecane, and cycloaliphatic solvents such as the hydrocarbons e.g., cyclohexane, methylcyclohexane and decalin, aromatic solvents such as the hydrocarbons e.g., toluene, xylene and cumene, alkanols e.g., of 1 to 10 carbon atoms such as ethanol, isopropanol, butanol and octanol, aliphatic ketones such as acetone, methyl ethyl ketone and methyl butyl ketone, and cycloaliphatic ketones such as cylopentanone and cyclohexanone, esters of carboxylic acids and alkanols such as ethyl acetate, butyl acetate and pentyl acetate and ethers such as dibutyl ether, diisopropyl ether, the methyl or ethyl monoether of ethylene glycol and the ethyl or butyl monoether of diethylene glycol.

The binders of the present invention are prepared by simply mixing the constituents A, B, C and D, at 0°–40° C., usually 10°–30° C., having introduced them in any order. It is of prime importance to use 60 to 120 parts, and preferably 70 to 100 parts, of constituent A and 3 to 25 parts, and preferably 5 to 20 parts, of constituent B per 10 to 2,000 parts, and preferably 12 to 1,700 parts, of constituent C and 20 to 1,500 parts, and preferably 40 to 1,200 parts, of constituent D; amounts outside these limits do not make it possible to obtain either binders which are stable on storage, or, by adding fillers to these binders, coatings with good physical properties.

The constituents can be incorporated in any order, but, in order to avoid precipitation of solid products or gel formation, it is necessary to add constituent C in the form of a solution of at most 90 percent strength in constituent D; it is however not necessary to dilute constituent C when it is added to constituents A and/or B which are themselves dissolved in constituent D as a solution of at most 80 percent strength. These solutions can be made up prior to mixing or during mixing, and it is advisable only to ensure that the liquid already prepared is perfectly homogeneous before introducing one of the constituents.

The binders obtained are liquids, of viscosity between 2 and 500 cPo at 25° C., which are stable on storage for at least 1 year in a sealed container. In order to convert these binders into coating compositions, fillers are added to them, the amounts and the nature of which depend strictly on the desired application, and so it is possible to add amounts as low as 5 parts and as high as 700 parts. Examples of suitable fillers are: Metal powders such as zinc, aluminium and magnesium powder, oxides such as silica, ground quartz, alumina, zirconium oxide, titanium oxide, zinc oxide, magnesium oxide, iron oxides, e.g., black iron oxide, and ferric oxide, cerium oxides, lanthanum oxides, praseodymium oxides and neodymium oxides, silicates such as mica, talc, vermiculite, kaolin, feldspar and zeolites, calcium carbonate, barium metaborate, iron pyrophosphate, zinc pyrophosphate, calcium pyrophosphate, zinc phosphate and carbon black and pigments such as phthalocyanins, chromium oxides, cadmium sulphide and cadmium sulphoselenides.

These fillers are introduced into and are intimately mixed with the binders of the present invention by means of conventional processes used by paint manufacturers. For example, grinding mills with rolls or turbine grinders can be used for the mixing.

The compositions thus prepared have the advantage of curing by simply drying in air in usually a few tens of minutes, it being possible to accelerate this period of time by heating at a temperature which can be as low as 50°–60° C. Their stability on storage is similar to that of conventional paints and they can be used in any applications requiring the presence of coatings with good physical properties, that is to say good adhesion and excellent resistance to heat shocks, to solvents, to corrosion and to weathering.

These compositions can give: Primers which are resistant to corrosion and which contain large amounts of metal powders as fillers, for protecting metal sections, sheet-metal, tanks and girders; this application is especially valuable in shipbuilding yards and in metal-working yards; these primers are resistant not only to corrosion but also to heat and their presence avoids the tedious, expensive but nevertheless necessary deposition of conventional protective undercoats after assembling industrial metal structures or ships' hulls; industrial paints which are resistant to high temperatures of about 500°–600° C., for example, for protecting silencers of internal combustion engines, factory chimneys and heating pipes; non-thermoplastic, glossy, pigmented, decorative paints which stove rapidly and adhere continuously, at about 250°–300° C., for coating industrial machines and household equipment and fire-resistant and water-repellent paints, deposited on wood, metals and asbestos.

When it is desired to produce coatings with drying times shorter than a few minutes, which are particularly well suited to industrial devices for automatic high speed spraying, it is advantageous to employ styrene-modified alkyd resins as the organic film-forming resin.

Styrene-modified alkyd resins are well known ("Alkyd Resins" by C. R. Martens, published by Reinhold Publishing Corp.—New York—1961) and are prepared easily by bringing organic polyacids and/or their anhydrides, polyols, mainly unsaturated vegetable oils, and styrene into contact. They can contain the usual polymerisation accelerators and/or catalysts and autoxidising agents, the presence and the nature of these adjuvants being a function of the temperature, at which it is desired that they cure.

Examples of organic polyacids and anhydrides, are phthalic anhydride, maleic anhydride, fumaric acid and terpene acids; examples of polyols are glycol, diethylene glycol, glycerol, pentaerythritol and monosaccharides; examples of unsaturated vegetable oils are soya oil, linseed oil, dehydrated castor oil, tung oil and oiticica oil.

Coatings with drying times less than a few minutes are also obtained when there is added to the mixture of the constituents A, B, C and D at least 0.5 percent of their weight of an alkyltriacyloxysilane used as such or in the form of an organopolysiloxane composition treated with this product. The preferred alkyltriacyloxysilane is methyltriacetoxysilane.

The organopolysiloxane compositions treated with an alkyltriacyloxysilane contain, in addition to this silane: One or more linear, cyclic or branched organopolysiloxanes which have 0.8 to 3 organic groups per silicon atom and contain units of the formulae $SiO_2$, $QSiO_{1.5}$, $Q_2SiO$ and $Q_3SiO_{0.5}$ in which the symbol Q represents a methyl, vinyl or phenyl group. These polymers can also contain at most 25 percent of their weight of hydroxyl and/or alkoxy groups (with one to four carbon atoms) bonded to the silicon atom; optionally organic polymers such as alkyl monoethers of polyalkylene glycols of molecular weights less than 1,000, the alkyl radical having one to five carbon atoms and the divalent alkylene radical having two to three carbon atoms, optionally, usual solvents such as toluene, xylene, cyclohexane, methylcyclohexane, trichloroethane and perchloroethylene and optionally, fillers such as pyrogenic or precipitated silica which may have been treated with an organosilicon compound, ground quartz, diatomaceous silica, metal oxides and carbon black.

The alkyltriacyloxysilane and/or the compositions treated with this silane are added to the homogeneous and stable binders consisting of silicates A, titanates B, resins C and solvents D, mixing also being achieved by simply stirring at 0°–40° C. The amounts of alkyltriacyloxysilane introduced represent at least 0.5 percent, and preferably 1 percent, of the weight of these binders, whether it is used as such or in the form of compositions in which it is present. The amounts which are suitable are a function of the composition of each binder, of the fillers added subsequently and of the working conditions; it is not necessary to use excessive amounts of alkyltriacyloxysilane, which represent for example more than 20 percent by weight of the binders, since the effect of accelerating the setting time takes place in the majority of cases with very much smaller amounts.

The binders prepared in this way from the constituents A, B, D and styrene-modified alkyd resins or from the constituents A, B, C and D, and in addition the alkyltriacyloxysilane or the compositions in which it is present can be deposited, after adding fillers, on the most diverse sustrates. The layers obtained, of thickness less than 50 microns, cure in the atmosphere within a few minutes and sometimes a few tens of seconds, and the coatings resulting therefrom are smooth and coherent and adhere effectively to the substrates.

The following examples illustrate the invention; parts and percentages are by weight:

EXAMPLE I

In order to prepare a paint which is resistant to corrosion, a binder is used consisting of:
- 90 parts of an ethyl polysilicate containing 40 percent by weight of $SiO_2$,
- 10 parts of a 70 percent solution in a mixture of cent by weight of $TiO_2$,
- 50 parts of xylene and
- 20 parts of a 70 percent solution in a mixture of paraffin hydrocarbons (of boiling points 148°–189° C.) of an alkyd resin modified by soya oil. This alkyd resin is produced by co-condensation of 65 parts of soya oil, 24 parts of phthalic anhydride and 11 parts of pentaerythritol.

The polysilicate and the polytitanate are mixed first at 0°–40° C. and xylene is added followed by the solution of the alkyd resin. The binder formed is of pH 6, is limpid and has a viscosity of 17 cPo at 25° C. After being left for 15 months in a sealed container, practically no change in the binder is found, the viscosity having substantially the same value as originally.

400 parts of zinc powder of average particle size $5\mu$ are dispersed intimately in 100 parts of this binder by means of a ball mill. A portion of the paint thus formed is stored in a closed container and the other portion is introduced into a pneumatic spray gun and then sprayed onto degreased steel sheets of thickness 20 mm.

Based on the test of Standard Specification AFNOR T 30037, the deposited coating, of thickness approximately $15\mu$, is dry to the touch after 15 minutes. This time is 17 minutes for the portion of the paint examined after 13 months' storage.

The treated steel sheets are then welded, two by two, by means of an oxyacetylene torch; it is noted that the coating is resistant to heat in the welding zones and that it does not sublime, which avoids fouling-up the torch. This absence of fouling is very valuable, particularly for manufacturing metal hulls of boats, and it makes an appreciable gain in time possible.

Furthermore, in order to examine the resistance to corrosion provided by the coating deposited on the sheets, the latter are kept for 1,000 hours in a salt mist; at the end of this period, it is found that the sheets do not show any trace of rust. The salt mist is formed continuously by passing air saturated with water vapour through a convergent-divergent device of the Venturi type, equipped in the divergent zone with a pipeline connected to a reservoir containing a 5 percent solution of sodium chloride. As it expands, the air sucks up the salt solution and combines with the droplets carried along to form a salt mist brought to a temperature of 35° C.

EXAMPLE II

In order to prepare a paint which is resistant to corrosion, a binder is used consisting of
- 95 parts of hexethoxydisiloxane,
- 8 parts of isopropyl titanate, 60 parts of a mixture of paraffin hydrocarbons of boiling points 100° C. to 158.° C. and 25 parts of the 70 percent solution of the alkyd resin described in Example I.

The hexaethoxydisiloxane and the isopropyl titanate are mixed with vigorous stirring and the mixture of paraffin hydrocarbons is added followed by the solution of alkyd resin.

The binder formed is of pH 6.8, is limpid, retains its properties on storage and has a viscosity of 17 cPo at 25° C. 600 parts of zinc powder of average particle size 1$\mu$ are introduced into 100 parts of this binder and the whole is mixed initimately by passing it through a ball mill; the paint obtained, deposited by spraying onto steel sheets of thickness 8/10 mm, is dry in the atmosphere in 12 minutes according to Standard Specification AFNOR T 30037; the thickness of the coating is approximately 65$\mu$.

The sheets thus coated are resistant to the salt mist described in Example I and can be joined by welding without undergoing appreciable deterioration in the heated zones.

EXAMPLE III

For paints which are resistant to high temperatures, a binder is used consisting of:

90 parts of an ethyl polysilicate containing 40 percent by weight of $SiO_2$, 10 parts of a butyl polytitanate containing 35 percent by weight of $TiO_2$ and 200 parts of a 51 percent solution in toluene of an organosilicon resin consisting of $(CH_3)_2SiO$ and $C_6H_5SiO_{1.5}$ units in the numerical ratio 0.66/1, containing 2.9 percent by weight of hydroxyl groups bonded to the silicon atoms.

The ethyl polysilicate and the butyl polytitanate are mixed with stirring, the solution of resin is added and a homogeneous binder of viscosity 40 cPo at 25° C. is obtained. This viscosity has not changed after 13 months' storage in a closed container.

33 parts of zinc powder of average particle size 3$\mu$, 66 parts of a mica powder of average particle size 44$\mu$ and 33 parts of black iron oxide of average particle size 15$\mu$ are introduced into 100 parts of this binder; the whole is ground in a tank equipped with a turbine stirrer and a paint which is stable on storage is thus obtained. 30 g. of a mixture of paraffin hydrocarbons of boiling points 148°–189° C. are added to this paint and it is deposited by spraying, by means of a pressure device, on one of the 2 faces of aluminium sheets. The paint is stoved for ½ hour at 200° C. in order to gain its maximum properties but is apparently dry in air in a few minutes.

In order to show the resistance to heat shocks of the coatings formed, the uncoated face of the sheets is heated to 600° C. by means of a Bunsen burner and the sheets are immersed immediately in cold water; no cracking or detachment of the coatings is observed.

EXAMPLE IV

For a water-repellent paint, a binder is used consisting of:

100 parts of ethyl silicate, 15 parts of n-hexyl titanate and 230 parts of the 51 percent solution in toluene of an organosilicon resin used in Example III.

The ethyl silicate and the solution of resin in toluene are mixed, the n-hexyl titanate is then added and a limpid binder is obtained. When stored in a sealed container for 15 months, its viscosity shows practically no change.

32 parts of finely divided barium metaborate of average particle size 3$\mu$ and 34 parts of a mica powder of particle size approximately 44$\mu$ are introduced into 100 parts of this binder; the whole is ground in a jar equipped with a turbine stirrer. 20 g. of xylene are added to the paint thus prepared and the mixture is then sprayed by means of a pressure device onto asbestos boards. After 10 minutes the paint is dry according to Standard Specification AFNOR T 30037, the thickness of the deposit being approximately 55$\mu$. The boards thus treated are fireproof and water-repellent, and are resistant, without losing their mechanical properties, to being spattered with hot water; they can be used as fire screens.

EXAMPLE V

In order to manufacture a non-thermoplastic decorative paint, a binder is used consisting of:

12 parts of an ethyl polysilicate containing 45 percent by weight of $SiO_2$, 1.3 parts of butyl polytitanate containing 38 percent by weight of $TiO_2$ and 100 parts of a 60 percent solution of a mixed silicone-polyester resin in a 1:1 by weight mixture of xylene and butanol. This resin is prepared by heating 2,100 parts of an organosilicon resin consisting of $(CH_3)_2SiO$ and $C_6H_5SiO_{1.5}$ units in the numerical ratio 0.66/1 and having 3.4 percent by weight of hydroxyl groups bonded to silicon atoms, and 900 parts of a polyester resin formed by co-condensation of glycerine (4 mols), isophthalic acid (2 mols) and 2-ethyl-hexanoic acid (3 mols).

The ethyl polysilicate and the butyl polytitanate are mixed and then the solution of mixed silicone-polyester resin is added. The binder prepared is homogeneous, stable on storage in a sealed container and has a viscosity of 75 cPo at 25° C.

25 parts of titanium oxide of the rutile type of average particle size 0.3$\mu$, 5 parts of cadmium sulphide of particle size approximately 0.1$\mu$ and 0.1 part of a dimethylpolysiloxane oil of viscosity 100 cSt at 25° C., as a spreading agent, are introduced into 100 parts of this binder; the whole is ground in a ball mill.

15 g. of a 1:1 by weight mixture of xylene and butanol are added to the paint obtained and the paint mixture is then introduced into a pressure spraying device. The contents of the device are sprayed onto sheets of aluminium-silicon alloy of thickness 5 mm, which have been simply degreased. The paint deposited is dry in air in 15 minutes according to Standard Specification AFNOR T 30037. A very slightly thermoplastic, smooth and adherent, glossy, cream film is obtained.

These sheets are heated for 15 days at 250° C. in a ventilated oven; after this period of heating, it is found that the films have resisted the heat without loss of gloss and without variation in shade.

EXAMPLE VI

In order to produce a non-thermoplastic decorative paint, a binder is prepared by proceeding as in Example V except that 300 parts of the 60 percent solution of the mixed silicone-polyester resin are used instead of 100 parts.

The binder formed is stable and limpid and has a viscosity of 180 cPo at 25° C.

By mixing 17 parts of ferric oxide with 100 parts of the binder in a turbine grinder, a paint is obtained which is easily deposited by spraying on magnesium sheets of thickness 2 mm. The layer is dry in 25 minutes according to Standard Specification AFNOR T 30037. The film thus formed is brown-red, glossy and adherent.

After heating for a period of 15 days at 250° C. in a ventilated oven, it is found that the film has been perfectly resistant to aging under hot conditions.

EXAMPLE VII

In order to prepare a paint which is resistant to corrosion, a binder is used consisting of:
   400 parts of an ethyl polysilicate containing 40 percent by weight of $SiO_2$,
   45 parts of a butyl polytitanate containing 33 percent by weight of $TiO_2$,
   175 parts of a 50 percent, in xylene, of a styrene-modified alkyd resin, based on soya oil, and 380 parts of xylene. This alkyd resin is prepared by co-condensation of 19 parts of phthalic anhydride, 30 parts of soya oil, 6 parts of glycerol and 45 parts of styrene.

The xylene and the alkyd resin are mixed first, at ambient temperature, and the ethyl polysilicate is added followed by the butyl polytitanate. The binder formed is a limpid liquid with a viscosity of 5 cPo at 25° C.

After being left for 12 months in a sealed container, no change is observed, the viscosity having essentially the same value as originally.

400 parts of a zinc powder of particle size 5 microns and 5 parts of a thickening agent based on hydrogenated castor oil are dispersed intimately in 100 parts of this binder.

A portion of the paint is stored in a closed container and the remainder is introduced into an automatic spray gun and then sprayed onto degreased steel sheets of thickness 20 mm. The deposited coating, of thickness approximately 15 microns, is dry to the touch, according to Standard Specification AFNRO T 30037, after 1 minute 10 seconds. This time is 1 minute 20 seconds for the portion of the paint examined after 8 months' storage.

EXAMPLE VIII

In order to prepare a paint which is resistant to corrosion, a binder is used consisting of:
   375 parts of an ethyl polysilicate containing 40 percent by weight of $SiO_2$,
   40 parts of a butyl polytitanate containing 33 percent by weight of $TiO_2$,
   420 parts of a mixture of paraffin hydrocarbons of boiling point 148° to 189° C. and
   165 parts of a 70 percent solution of a long alkyd resin based on soya oil, in the abovementioned mixture of paraffin hydrocarbons. This resin is obtained by co-condensation of 65 parts of soya oil, 24 parts of phthalic anhydride and 11 parts of pentaerythritol.

The alkyd resin and the solvent are mixed first at ambient temperature, and then the alkyl polysilicate is added followed by the alkyl polytitanate. The binder obtained is divided into 2 equal portions. 8.25 g. of methyltriacetoxysilane are added to the first portion and 50 g. of the solution described in Example I of French Pat. No. 1,471,352, but containing only 70 percent by weight of 1,1,1-trichloroethane instead of 95 percent, are added to the second portion.

400 parts of a zinc powder of average particle size 5 microns are dispersed in 100 parts of each of these binders. Both paints thus prepared are sprayed, by means of a pneumatic spray gun, onto degreased metal sheets of the thickness 20 mm. The deposited coatings, of thickness 20 microns, are dry to the touch, according to Standard Specification AFNOR T 30037 after 2 minutes.

I claim:
1. A binder composition comprising, in parts by weight,
   60 to 120 parts of component A, which is at least one alkyl silicate or alkyl polysilicate, the alkyl radical of which contains 1 to 3 carbon atoms,
   3 to 25 parts of component B, which is at least one alkyl titanate or alkyl polytitanate, the alkyl radical of which contains 3 to 8 carbon atoms,
   10 to 2,000 parts of component C, which is at least one film forming resin selected from the group consisting of (a) film forming organic resins containing at least the elements carbon, hydrogen and oxygen but not silicon and (b) co-condensation products of organic resins (a) with film forming organic resins containing at least the elements carbon, hydrogen, oxygen and silicon, and
   20 to 1,500 parts of component D, which is an organic solvent.
2. A composition according to claim 1, wherein the component B, the alkyl radicals are isopropyl, butyl or hexyl.
3. A composition according to claim 1, wherein the component D is an aliphatic hydrocarbon of 5 to 20 carbon atoms, an aromatic hydrocarbon or an alkanol.
4. A composition according to claim 1, wherein the component C is an alkyd resin modified with styrene, a polyester resin or co-condensate of a polyester resin and an organopolysiloxane which contains for each silicon atom 1–1.8 organic groups bonded to silicon which organic groups are methyl and phenyl groups and 0.001–1.5 free hydroxyl or alkoxyl groups.
5. A composition according to claim 1, comprising at least 0.5 percent by weight (based on the weight of components A, B, C and D) of an alkyltriacyloxysilane or a composition comprising a polysiloxane which has been treated with an alkyltriacyloxysilane.
6. A composition according to claim 5, wherein the alkyltriacyloxysilane is methyltriacetoxysilane.
7. A composition according to claim 1, which comprises 70–100 parts of constituent A, which is at least one silicate selected from the group consisting of ethyl silicate, hexaethoxydisiloxane and ethylpolysilicate containing silicon in an amount of 40–45 percent by weight (expressed as silica), 5–20 parts of constituent B, which is at least one titanate selected from the group consisting of isopropyl titanate, butyl titanate, n-hexyltitanate and polytitanate containing titanium in an amount of titanium of 33–38 percent by weight (ex- pressed as titanium dioxide), 12–1,700 parts of constituent C, which is at least one resin selected from the group consisting of alkyd resins, based on soya oil, alkyd resins modified by styrene and co-condensates of a polyester and an organopolysiloxane having repeating units of formula $(CH_3)_2SiO$ and $C_6H_5SiO_{1.5}$ in the number ratio 0.66:1 containing 2.9–3.4 percent by weight of hydroxyl groups bonded to silicon atoms, and 40–1,200 parts of constituent D which is at least one solvent selected from the group consisting of paraffin hydrocarbons, toluene, xylene and butanol.

8. A curable composition, which comprises a filler and a binder according to claim 1.

9. A composition according to claim 8, wherein the filler is at least one selected from the group consisting of zinc powder, titanium oxide, an iron oxide, mica and barium metaborate.

* * * * *